United States Patent [19]

Yamazaki et al.

[11] Patent Number: 4,789,785

[45] Date of Patent: Dec. 6, 1988

[54] RADIATION IMAGE CONVERTING MATERIAL

[75] Inventors: Kikuo Yamazaki; Akira Kitada, both of Kanagawa, Japan

[73] Assignee: Fuji Photo Film Co., Ltd., Japan

[21] Appl. No.: 940,416

[22] Filed: Dec. 11, 1986

[30] Foreign Application Priority Data

Dec. 11, 1985 [JP] Japan ............................... 60-278664
Dec. 11, 1985 [JP] Japan ............................... 60-278665

[51] Int. Cl.[4] ................................................ G01J 1/58

[52] U.S. Cl. .............................. 250/487.1; 250/484.1; 250/483.1

[58] Field of Search ............... 250/483.1, 484.1, 487.1; 350/105

[56] References Cited

U.S. PATENT DOCUMENTS 3,944,835 3/1976 Vosburgh ......................... 250/487.1
4,575,635 3/1986 Arakawa et al. ................ 250/484.1

*Primary Examiner*—Janice A. Howell
*Assistant Examiner*—Richard Hanig
*Attorney, Agent, or Firm*—Gerald J. Ferguson, Jr.

[57] ABSTRACT

A radiation image converting material comprising a support, a light-reflecting layer which comprises a binder and a light-reflecting material dispersed therein, and a phosphor layer which comprises a binder and a phosphor dispersed therein, superposed in this order, which is characterized in that said light-reflecting layer contains polymer particles of hollow structure as the light-reflecting material. A radiographic intensifying screen containing a phosphor which gives spontaneous emission and a radiation image storage panel containing a stimulable phosphor which gives stimulated emission are disclosed.

11 Claims, 1 Drawing Sheet

RADIATION IMAGE CONVERTING MATERIAL

BACKGROUND OF THE INVENTION

1. Field of the Invention

The present invention relates to a radiation image converting material having a light-reflecting layer between a support and a phosphor layer. More particularly, the invention relates to a radiographic intensifying screen, and a radiation image storage panel employed in a radiation image recording and reproducing method utilizing a stimulable phosphor.

2. Description of the Prior Art

In a variety of radiography such as medical radiography for diagnosis and industrial radiography for nondestructive inspection, a radiographic intensifying screen is generally employed in close contact with one or both surfaces of a radiographic film such as an X-ray film for enhancing the radiographic speed of the system.

As a method replacing the radiography, a radiation image recording and reproducing method utilizing a stimulable phosphor as described, for instance, in U.S. Pat. No. 4,239,968, has been recently paid much attention. In this method, a radiation image storage panel comprising a stimulable phosphor (i.e., stimulable phosphor sheet) is employed, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at considerably smaller dose, as compared with the conventional radiography. Accordingly, this method is of great value especially when the method is used for medical diagnosis.

The radiation image converting materials such as the radiographic intensifying screen employed in the conventional radiography and the radiation image storage panel employed in the above-described radiation image recording and reproducing method, consist essentially of a support and a phosphor layer provided thereon. Further, a transparent film is generally provided on the free surface of the phosphor layer (a surface not facing the support) to keep the phosphor layer from chemical deterioration and physical shock.

In the radiographic intensifying screen, the phosphor layer comprises a binder and phosphor particles dispersed therein. When excited with a radiation such as X-rays having passed through an object, the phosphor particles emit light of high luminance (spontaneous emission) in proportion to the dose of the radiation. Accordingly, the radiographic film placed in close contact with the phosphor layer of the screen can be exposed sufficiently to form a radiation image of the object, even if the radiation is applied to the object at a ralatively small dose.

In the radiation image storge panel, the phosphor layer comprises a binder and stimulable phosphor particles dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photelectrically detected to give electric signals, so as to reproduce a visible image from the electric signals.

The radiographic intensifying screen and radiation image storage panel are desired to have a high radiographic speed (or high sensitivity) and provide an image of high quality (high sharpness, high graininess, ect.). Especially when the object is a human body, the radiographic speed of the screen and the sensitivity of the panel are desired to be increased, even if the level is low, for the purpose of reducing the radiation dose applied to the human body.

For enhancing the radiographic speed of a radiographic intensifying screen or enhancing the sensitivity of a radiation image storage panel, there is known a method of providing a light-reflecting layer between the support and the phosphor layer by depositing a metal such as aluminum, etc. on the surface of the support, laminating a metal foil such as an aluminum foil on the support, or applying a coating dispersion comprising a white pigment (light-reflecting material) dispersed in an appropriate binder onto the support. Examples of the white pigment include titanium dioxide, white lead, zinc sulfide, aluminum oxide, magnesium oxide and alkaline earth metal fluorohalides, as described in Japanese patent provisional publications No. 56(1981)-12600, No. 59(1984)-162500 (corresponding to U.S. application Ser. No. 586,691) and No. 59(1984)-100184 (corresponding to U.S. Pat. No. 4,618,778).

By providing such light-reflecting layer to the intensifying screen, a light emitted by the phosphor of the phosphor layer and advancing towards the support is reflected by the light-reflecting layer without being absorbed in the support or passing through the support so as to be released from the phosphor layer side-surface of the screen. Accordingly, the radiographic film is also exposed to the reflected light. By providing such light-reflecting layer to the panel, a light emitted by the stimulable phosphor of the phosphor layer and advancing towards the support is reflected by said layer and released from the panel surface in the same manner. Accordingly, the reflected light is also detected and converted to electric signals by means of a photosensor.

SUMMARY OF THE INVENTION

It is an object of the present invention to provide radiation image converting materials such as a radiographic intensifying screen and a radiation image storage panel, which are improved in the sensitivity.

It is another object of the invention to provide a radiographic intensifying screen improved in the radiographic speed, with hardly lowering the image quality such as the sharpness and the graininess.

It is further object of the invention to provide a radiation image storage panel improved in the sensitivity and the graininess of an image provided thereby, with hardly lowering the sharpness.

The object can be accomplished by a radiation image converting material comprising a support, a light-reflecting layer which comprises a binder and a light-reflecting material dispersed therein, and a phosphor layer which comprises a binder and a phosphor dispersed therein, superposed in this order, which is characterized in that said light-reflecting layer contains polymer particles of hollow structure as the light-reflecting material.

According to the present invention, hollow particles made of a polymer material are employed as a light-reflecting material for a light-reflecting layer of a radiation image converting material in place of the conventional white pigment, whereby the sensitivity of the converting material is improved.

As a result of studies on the prevention of a light emitted by the phosphor from scattering in the direction of the support to extinguish, the present inventors have found that a light-reflecting property of a layer comprising a polymer material can be enhanced by forming a great number of voids at extremely small size in the layer, because of a large difference between a refractive index of the polymer material and that of an air. In the invention, the formation of the extremely small sized voids is concretely performed by dispersing polymer particles of hollow structure in the binder layer.

The light emitted by the phosphor advancing towards the support is reflected on the interface between the polymer shell and the inner air of the hollow particle in the light-reflecting layer owing to the difference of the refractive index therebetween, to be released from the phosphor layer side-surface of the radiation image converting material. For example, the light released from the surface of the radiographic intensifying screen contributes to the exposure of a radiographic film. The light released from the surface of the radiation image storage panel (i.e., read-out side surface of the panel) is detected as image information.

Any polymer particle in the form of hollow structure has been hardly known yet, and it was impossible to obtain a fine particle having an outer diameter of not larger than 1 μm. Very recently, such a fine particle of hollow polymer (may be called a polymer pigment) has been developed. In the radiation image converting material of the present invention, a coating dispersion comprising an appropriate binder and the hollow polymer particles dispersed therein is applied onto the support, or an independently prepared thin film in which the hollow polymer particles are dispersed is combined with the support by the use of an adhesive agent, to provide a binder layer having a great number of extremely small sized voids as a light-reflecting layer.

Hence, the resulting radiation image converting material can be enhanced in the sensitivity. Particularly, the hollow polymer particle employed in the invention shows an excellent reflecting property even in the shorter wavelength region of 300–450 nm, as compared with a white pigment such as titanium dioxide conventionally employed in a light-reflecting layer. In the case of using a phosphor giving sponteneous emission in the near ultraviolet to visible region such as a divalent europium activated alkaline earth metal fluorohalide phosphor (peak wavelength of the emission: approx. 390 nm) as a phosphor, the intensifying screen can be prominently enhanced in the radiographic speed. In the case of using a phosphor giving stimulated emission in said region such as the above phosphor (peak wavelength of the emission: approx. 390 nm) as a stimulable phosphor, the panel can be prominently enhanced in the sensitivity. Further, even as compared with white pigments such as alkaline earth metal fluorohalides, etc., which have reflection spectra extending to the short wavelength region, the hollow polymer particles employed in the invention are not lowered in the dispersibility by appropriately selecting a binder employed therewith, although the particles are of very small size. In addition, since the hollow polymer particles are relatively cheap, cost for the preparation of the converting material can be reduced.

Further, the radiographic intensifying screen according to the invention can be remarkably enhanced in the radiographic speed, almost without lowering the image quality such as sharpness. Especially, it is possible to enhnace the radiographic speed of the screen and at the same time to improve the graininess of the image provided thereby.

On the other hand, a radiation image storage panel is generally read out by sequentially irradiating the panel with stimulating rays (e.g. scanning), and the sharpness of the obtained image is influenced not by spreading of the emitted light but by spreading of the stimulating rays in the panel. In a panel provided with the conventional light-reflecting layer, stimulating rays having passed through the phosphor layer is generally reflected by the light-reflecting layer to spread within the phosphor layer, and hence the obtained image is liable to be lowered in the sharpness with a certain level. According to the panel of the invention, however, the sensitivity of the panel can be prominently enhanced almost without lowering the sharpness of the image.

Furthermore, the radiation image storage panel according to the invention can provide an image of highly improved graininess, as well as being improved in the sensitivity. In other words, when the panel of the invention has the same level of the sensitivity and the image quality such as graininess as those of the conventional panel, the thickness of the phosphor layer can be made thinner than the conventional one, whereby the sharpness of the image provided by the panel can be enhanced.

DETAILED DESCRIPTION OF THE INVENTION

Figure 1:
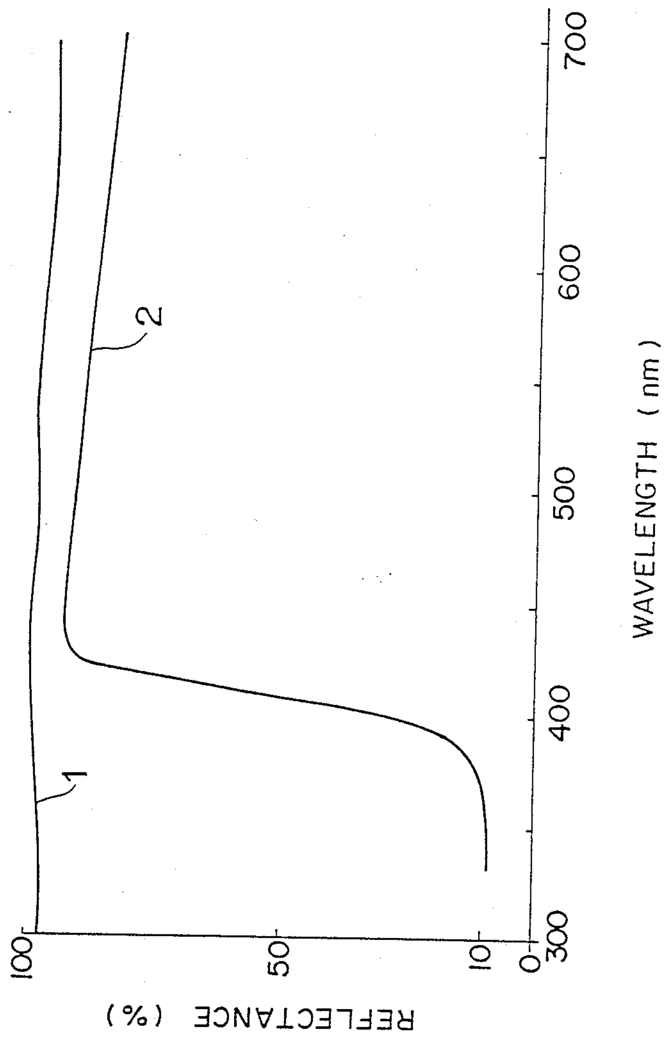
FIG. 1 is a graph showing a reflection spectrum of a light-reflecting layer containing hollow polymer particles employed in the radiation image converting material according to the present invention (Curve 1), and a reflection spectrum of a conventional light-reflecting layer containing titanium dioxide (Curve 2).

The radiation image converting material of the present invention having the above-mentioned favorable characteristics can be prepared, for instance, in the following manner. The radiographic intensifying screen and the radiation image storage panel, which are representative ones of the radiation image converting material, are to have the same composition except that a stimulable phosphor is employed in the panel.

A support material employable in the invention can be selected from those employed in the known radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image converting material and handling thereof, a plastic film is preferably employed as the support material in the invention. The plastic film may contain a light-absorbing material such as carbon black, or may contain a light-reflecting material such as titanium dioxide. The former is appropriate for preparing a high-sharpness type radiation image converting material, while the latter is appropriate for preparing a high-sensitivity type radiation image converting material.

On the surface of the support, a subbing layer may be provided by coating a polymer material such as gelatin to enhance the adhesion between the support and a light-reflecting layer to be formed thereon. In the case of intensifying screen, a metal foil such as lead foil, lead alloy foil or tin foil may be provided to remove scattered radiation. In the case of panel, an antistatic layer comprising $In_2O_3$, $SnO_2$, etc. may be provided to enhance an antistatic property of the resulting panel.

Subsequently, on the support is provided a light-reflecting layer.

The light-reflecting layer, which is a characteristic requisite of the present invention, comprises a binder and polymer particles of hollow structure as a light-reflecting material dispersed therein.

The polymer particle of hollow structure (polymer pigment) employable in the invention is a fine particle, generally having an outer diameter ranging from 0.2 to 1 μm and an inner diameter (diameter of hollow) ranging from 0.05 to 0.7 μm. Examples of the hollow polymer particles include styrene polymer particles and styreneacrylic copolymer particles which are produced by bonding styrene monomers and/or acrylic monomers by use of an appropriate crosslinking agent to make a spherical shell (core-shell polymerization).

The hollow polymer particle has a void (hollow) inside, and has a white gloss similar to that of an inorganic pigment such as titanium dioxide since the light having passed through the polymer shell of the particle is reflected by the wall surrounding the void. The hollow polymer particle shows a reflection spectrum in the near ultraviolet to visible region (longer wavelength region of not shorter than 300 nm), and particularly in the near ultraviolet region of 300–450 nm, the particle has a high reflectance which is unobtainable by the white pigment conventionally employed as a light-reflecting material such as titanium dioxide. For this reason, this hollow polymer particle is very suitable as a light-reflecting material to a radiographic intensifying screen containing a phosphor which gives spontaneous emission in the near ultraviolet to visible region. The hollow polymer particle is also suitable to a radiation image storage panel containing a stimulable phosphor which gives stimulated emission in the same region.

The light-reflecting layer can be formed on the support, for instance by the following process. The above-mentioned hollow polymer particles are added to an appropriated binder and they are well mixed to prepare a homogeneous coating dispersion comprising the hollow polymer particles dispersed in the binder. The coating dispersion is evenly applied over the surface of the support to form a layer of the coating dispersion, which is heated to dryness to form a light-reflecting layer on the support. Alternatively, the coating dispersion is coated over a sheet such as a glass plate or a plastic film and dried to previously prepare a thin film in which the hollow polymer particles are dispersed. The thin film is combined with the support by the use of an adhesive agent to provide a light-reflecting layer onto the support.

A binder employable for the light-reflecting layer is aqueous polymer materials such as an acrylic acid ester copolymer, or can be selected from such binders for the phosphor layer as described hereinafter.

The ratio between the binder and the hollow polymer particles in the coating dispersion is generally in the range of 1:1 to 1:50 (binder:particles), by weight. Preferred is in the range of 1:2 to 1:20 (binder:particles), by weight, from the viewpoint of adhesion to the support, etc. The coating dispersion may further contain a known light-reflecting material such as a white pigment, and the resulting light-reflecting layer may be composed of a mixture of the hollow polymer particles and the white pigment. For instance, in the case of the mixture of the hollow polymer particles and titanium dioxide, the hollow polymer particles can fill up the voids produced by the titanium dioxide having a larger particle size, so that the masking from light can be highly improved as compared with the conventional case of simple titanium dioxide. The thickness of the light-reflecting layer is preferably in the range of 5–100 μm.

The surface of the light-reflecting layer may be provided with protruded and depressed portions for enhancement of the sharpness of an image, as described in Japanese patent provisional publication No. 58(1983)-200200 (corresponding to U.S. patent application Ser. No. 496,278).

On the light-reflecting layer is provided a phosphor layer. The phosphor layer basically comprises a binder and phosphor particles dispersed therein.

When preparing a radiographic intensifying screen, there is employed a phosphor which gives spontaneous emission, said phosphor not being necessary to give stimulated emission.

A variety of phosphors employable for the intensifying screen have been known, and any one of them can be used in the invention. Examples of the phosphor preferably employable in the invention, which emits light in the ultraviolet to visible region (blue region, green region and red region) include:

tungstate phosphors such as $CaWO_4$, $MgWO_4$ and $CaWO_4$: Pb;

terbium activated rare earth oxysulfide phosphors such as $Y_2O_2S$:Tb, $Gd_2O_2S$:Tb, $La_2O_2S$:Tb, $(Y,Gd)_2O_2S$:Tb, $(Y,Gd)_2O_2S$:Tb,Tm;

terbium activated rare earth phosphate phosphors such a $YPO_4$:Tb, $GdPO_4$:Tb and $LaPO_4$:Tb;

terbium activated rare earth oxyhalide phosphors such as LaOBr:Tb, LaOBr:Tb,Tm, LaOCl:Tb, LaOCl:Tb,Tm, GdOBr:Tb and GdOCl:Tb;

thulium activated rare earch oxyhalide phosphors such as LaOBr:Tm and LaOCl:Tm;

barium sulfate phosphors such as $BaSO_4$:Pb, $BaSO_4$:$Eu^{2+}$ and $(Ba,Sr)SO_4$:$Eu^{2+}$;

divalent europium activated alkaline earth metal phosphate phosphors such as $Ba_3(PO_4)_2$:$Eu^{2+}$ and $(Ba,Sr)_3(PO_4)_2$:$Eu^{2+}$;

divalent europium activated alkaline earth metal fluorohalide phosphors such as BaFCl:$Eu^{2+}$, BaFBr:$Eu^{2+}$, BaFCl:$Eu^{2+}$,Tb, BaFBr:$Eu^{2+}$,Tb, $BaF_2$.$BaCl_2$.KCl:$Eu^{2+}$, $BaF_2$.$BaCl_2$.x$BaSO_4$.KCl:$Eu^{2+}$ and $(Ba,Mg)F_2$.$BaCl_2$.KCl:$Eu^{2+}$;

iodide phosphors such as CsI:Na, CsI:Tl, NaI:Tl and KI:Tl;

sulfide phosphors such as ZnS:Ag, (Zn,Cd)S:Ag, (Zn,Cd)S:Du and (Zn,Cd)S:Cu,Al;

hafnium phosphate phosphors such as $HfP_2O_7$:Cu;

europium activated rare earth oxysulfide phosphors such as $Y_2O_2S$:Eu, $Gd_2O_2S$:Eu, $La_2O_2S$:Eu and $(Y,Gd)_2O_2S$:Eu;

europium activated rare earth oxide phosphors such as $Y_2O_3$:Eu, $Gd_2O_3$:Eu, $La_2O_3$:Eu and $(Y,Gd)_2O_3$:Eu;

europium activated rare earth phosphate phosphors such as $YPO_4$:Eu, $GdPO_4$:Eu and $LaPO_4$:Eu; and europium activated rare earth vanadate phosphors such as $YVO_4$:Eu, $GdVO_4$:Eu, $LaVO_4$:Eu and $(Y,Gd)VO_4$:Eu.

The above-described phosphors are given by no means to restrict the phosphor employable in the intensifying screen of the invention. Any other phosphors can also be employed, provided that the phosphor emits light having a wavelength within near ultraviolet to visible region when exposed to a radiation such as X-rays.

When preparing a radiation image storage panel, there is employed a stimulable phosphor. The stimulable phosphor, as described hereinbefore, gives stimulated emission when excited with stimulating rays after exposure to a radiation. From the viewpoint of practical use, the stimulable phosphor is desired to emit light in the wavelength region of 300–500 nm when excited with stimulating rays in the wavelength region of 400–900 nm.

Examples of the stimulable phosphor employable in the panel of the invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO.x$Al_2O_3$:Eu, in which x is a number satisfying the condition of $0.8 \leqq x \leqq 10$, and $M^{2+}$O.x$SiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

$(Ba_{1-x-y},Mg_x,Ca_y)$FX:a$Eu^{2+}$, in which X is at least one element selected from the group consisting of Cl and Br, x and y are numbers satisfying the conditions of $0<x+y \leqq 0.6$ and $xy \neq 0$, and a is a number satisfying the condition of $10^{-6} \leqq a \leqq 5 \times 10^{-2}$, as described in Japanese patent provisional publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in U.S. Pat. No. 4,236,078;

$(Ba_{1-x},M^{II}_x)$FX:yA, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}$FX.xA:yLn, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0<y \leqq 0.2$, respectively, as described in Japanese patent provisional publication No. 55(1980)-160078;

$(Ba_{1-x},M^{II}x)F_2$.aBa$X_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 10^{-2}$, respectively, as described in Japanese patent provisional publication No. 56(1981)-116777;

$(Ba_{1-x},M^{II}_x)F_2$•aBa$X_2$:yEu,zB, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 2 \times 10^{-1}$, respectively, as described in Japanese patent provisional publication No. 57(1982)-23673;

$(Ba_{1-x},M^{II}_x)F_2$•aBa$X_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0<z \leqq 5 \times 10^{-1}$, respectively, as described in Japanese patent provisional publication No. 57(1982)-23675;

$M^{III}$OX:xCe, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese patent provisional publication No. 58(1983)-69281;

$Ba_{1-x}M_{x/2}L_{x/2}$FX:y$Eu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0<y \leqq 0.1$, respectively, as described in U.S. patent application Ser. No. 497,805;

BaFX•xA:y$Eu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0<y \leqq 0.1$, respectively, as described in U.S. patent application Ser. No. 520,215;

BaFX•xA:y$Eu^{2+}$, in which X is at least one halogen selected from the group consisting of Cl, Br and I; A is at least one fired product of a hexafluoro compound selected from the grou consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0 < y \leqq 0.1$, respectively, as described in U.S. patent application sec. No. 502,648;

$BaFX \cdot xNaX':aEu^{2+}$, in which each of X and X' is at least one halogen selected from the group consisting of Cl, Br and I; and x and a are numbers satisfying the conditions of $0 < x \leqq 2$ and $0 < a \leqq 0.2$, respectively, as described in Japanese patent provisional publication No. 59(1984)-56479;

$M^{II}FX \cdot xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leqq 2$, $0 < y \leqq 0.2$ and $0 < z \leqq 10^{-2}$, respectively, as described in U.S. patent application Ser. No. 535,928;

$M^{II}FX \cdot aM^{I}X' \cdot bM'^{II}X''_2 \cdot cM^{III}X'''_3 \cdot xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \geqq 10^{-6}$; and x and y are numbers satisfying the conditions of $0 < x \leqq 0.5$ and $0 < y \leqq 0.2$, respectively, as described in U.S. patent application Ser. No. 543,326;

$M^{II}X_2 \cdot aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leqq a \leqq 10.0$ and $0 < x \leqq 0.2$, respectively, as described in U.S. patent application Ser. No. 660,987;

$M^{II}FX \cdot aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leqq a \leqq 4.0$ and $0 < x \leqq 0.2$, respectively, as described in U.S. patent application Ser. No. 668,464; and $M^{I}X:xBi$, in which $M^{I}$ is at least one alkali metal selected from the group consisting of Rb and Cs; X is at least one halogen selected from the group consisting of Cl, Br and I; and x is a number satisfying the condition of $0 < x \leqq 0.2$, as described in U.S. patent application Ser. No. 846,919.

The $M^{II}X_2 \cdot aM^{II}X'_2:xEu^{2+}$ phosphor described in the above-mentioned U.S. patent application Ser. No. 660,987 may contain the following additives in the following amount per 1 mol of $M^{II}X_2 \cdot aM^{II}X'_2:bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0 < b \leqq 10.0$, as described in U.S. patent application Ser. No. 699,325;

$bKX'' \cdot cMgX'''_2 \cdot dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leqq b \leqq 2.0$, $0 \leqq c \leqq 2.0$, $0 \leqq d \leqq 2.0$ and $2 \times 10^{-5} \leqq b+c+d$, as described in U.S. patent application Ser. No. 723,819;

yB, in which y is a number satisfying the condition of $2 \times 10^{-4} \leqq y \leqq 2 \times 10^{-1}$, as described in U.S. patent application Ser. No. 727,974;

bA, in which A is at least one oxide selected from the group consisting of $SiO_2$ and $P_2O_5$; and b is a number satisfying the condition of $10^{-4} \leqq b \leqq 2 \times 10^{-1}$, as described in U.S. patent application Ser. No. 727,972;

bSiO, in which b is a number satisfying the condition of $0 < b \leqq 3 \times 10^{-2}$, as described in U.S. patent application Ser. No. 797,971;

$bSnX''_2$, in which X'' is at least one halogen selected from the group consisting of F, Cl, Br and I; and b is a number satisfying the condition of $0 < b \leqq 10^{-3}$, as described in U.S. patent application Ser. No. 797,971;

$bCsX'' \cdot cSnX'''_2$, in which each of X'' and X''' is at least one halogen selected from the group consisting of F, Cl, Br and I; and b and c are numbers satisfying the conditions of $0 < b \leqq 10.0$ and $10^{-6} \leqq c \leqq 2 \times 10^{-2}$, respectively, as described in U.S. patent application Ser. No. 850,715; and $bCsX'' \cdot yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leqq 10.0$ and $10^{-6} \leqq y \leqq 1.8 \times 10^{-1}$, respectively, as described in U.S. patent application Ser. No. 850,715.

Among these above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the panel of the invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl(meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl(meth)acrylate, a mixture of nitrocellulose and linear polyester, and a mixture of nitrocellulose and polyalkyl(meth)acrylate. These binders may be crosslinked with a crosslinking agent.

The phosphor layer can be formed on the light-reflecting layer, for instance, by the following procedure.

In the first place, the above-described phosphor (phosphor or stimulable phosphor is employed according to the intensifying screen or the panel to be prepared) and binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethyl ether; and mixtures of the above-mentioned compounds.

The ratio between the binder and the phosphor in the coating dispersion may be determined according to the characteristics of the aimed radiation image converting material and the nature of the phosphor employed. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such a triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the light-reflecting layer to form a layer of the coating dispersion. The coating procedure can be carried out by a conventional method such as a method using a doctor blade, a roll coater or a knife coater.

After applying the coating dispersion onto the light-reflecting layer, the coating dispersion is then heated slowly to dryness so as to complete the formation of a phosphor layer. The thickness of the phosphor layer varies depending upon the characteristics of the aimed radiation image converting material, the nature of the phosphor, the ratio between the binder and the phosphor, etc. Generally, the thickness of the phosphor layer is within the range of from 20 μm to 1 mm, and preferably from 50 to 500 μm.

The phosphor layer can be provided onto the light-reflecting layer by the methods other than that given in the above. For instance, the phosphor layer is initially prepared on a sheet (false support) such as a glass plate, metal plate or plastic sheet using the aforementioned coating dispersion and then thus prepared phosphor layer is superposed on the light-reflecting layer by pressing or using an adhesive agent.

On the surface of the phosphor layer not facing the light-reflecting layer, a transparent protective film may be provided to protect the phosphor layer from physical and chemical deterioration.

The protective film can be provided onto the phosphor layer by coating the surface of the phosphor layer with a soluton of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 μm.

The radiation image storage panel of the invention may be colored with a colorant to enhance the sharpness of the resulting image, as described in U.S. Pat. No. 4,394,581 and U.S. patent application Ser. No. 326,642. For the same purpose, the panel for the invention may contain a white powder in the phosphor layer, as described in U.S. Pat. No. 4,350,893.

The following examples further illustrate the present invention, but these examples are understood to by no means restrict the invention.

EXAMPLE 1

Hollow particles of styrene-acrylic polymer (trade name: VONCOAT PP-2000S, available from Dainippon Ink & Chemicals Inc., Japan) and an acrylic acid ester copolymer (trade name: Arontac A-2422H, available from Toagosei Chemical Industry Co., Ltd., Japan) are sufficiently mixed, to prepared a homogeneous coating dispersion having the ratio between the binder and the hollow particles of 1:5 (binder:particles, by weight).

The coating dispersion was applied evenly onto a polyethylene terephthalate sheet (support, thickness: 250 μm) placed horizontally on a glass plate by using a doctor blade. Subsequently, the support having a layer of the coating dispersion was placed in an oven and heated to dryness at a temperature gradually rising from 25° to 100° C. Thus, a light-reflecting layer having a thickness of 50 μm was formed on the support.

To a mixture solvent of ethanol and methyl ethyl ketone having a mixing ratio of 7:3 (ethanol:methyl ethyl keton) were successively added 90 parts by weight of vinyl acetate (available from Kishida Chemicals Co., Ltd., Japan), 10 parts by weight of nitrocellulose and a particulate calcium tungstate ($CaWO_4$) phosphor. The mixture was sufficiently stirred by means of a propeller agitator to obtain a homogeneous coating dispersion having a mixing ratio of 1:20 (binder:phosphor, by weight) and a viscosity of 25–30 PS (at 25° C.).

The coating dispersion was applied onto the light-reflecting layer and dried in the same manner as described above, to form a phosphor layer having a thickness of 150 μm.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiographic intensifying screen consisting essentially of a support, a light-reflecting layer, a phosphor layer and a transparent protective film was prepared.

COMPARISON EXAMPLE 1

The procedure of Example 1 was repeated except for using titanium dioxide instead of the hollow particles of styrene-acrylic polymer, to form a light-reflecting layer on the support.

Using the support provided with the light-reflecting layer, a radiographic intensifying screen consisting essentially of a support, a light-reflecting layer, a phosphor layer and a transparent protective film was prepared in the same manner as described in Example 1.

Each of the light-reflecting layers prepared in Example 1 and Comparison Example 1 as measured on the spectral reflectance by means of a spectrophotometer (automatic recording spectrophotometer 330-type, produced by Hitachi, Ltd.). The results are shown in FIG. 1 and also set forth in Table 1.

FIG. 1 shows reflection spectra of the light-reflecting layers:

Curve 1: spectrum of the light-reflecting layer containing hollow polymer particles: and Curve 2: spectrum of the light-reflecting layer containing titanium dioxide.

TABLE 1

| | Reflectance (%) | |
|---|---|---|
| Light-reflecting layer | 350 nm | 550 nm |
| Hollow polymer particles | 95 | 95 |
| Titanium dioxide | 9 | 88 |

As is evident from the results shown in FIG. 1 and Table 1, the reflection spectrum of the light-reflecting layer containing hollow polymer particles employed in the radiographic intensifying screen of the present invention (Example 1) extended to a shorter wavelength side than that of the light-reflecting layer containing titanium dioxide (Comparison Example 1), and the light-reflecting layer according to the invention had excellent reflecting property particularly in the near ultraviolet to visible region of 300–450 nm.

The radiographic intensifying screens were evaluated on the radiographic speed, the sharpness and the graininess of an image provided thereby according to the following tests.

(1) Radiographic speed

The radiographic intensifying screen was exposed to X-rays at a voltage of 80 KVp to measure the radiographic speed.

(2) Sharpness of image

The radiographic intensifying screen was combined with an X-ray film in a cassette and exposed to X-rays at a voltage of 80 KVp through a CTF chart. The film was then developed to obtain a visible image, and the contrast transfer function (CTF) value of the visible image was determined. The sharpness of the image was evaluated with the value (%) at a spatial frequency of 2 cycle/mm.

(3) Graininess of image

The radiographic intensifying screen was combined with an X-ray film in a cassette and exposed to X-rays at a voltage of 80 KVp through a water phantom (thickness: 10 cm) and an aluminum plate (thickness: 10 mm) at a density of 1.0. The X-ray film was then developed using a developing solution (trade name: RDIII, available from Fuji Photo Fiom Co., Ltd., Japan) by an automatic developing machine (trade name: New RN, manufactured by the same) for 90 sec. at 35° C., to obtain a visible image on the film. The film was measured to determine the RMS value by the use of a microphotometer (aperture: 300 μm×300 μm). The graininess of the image was evaluated on the basis of the RMS values.

The results are set forth in Table 2. The radiographic speed and the sharpness of the image were respectively expressed by a relative value based on the value of Comparison Example 1 being 100.

TABLE 2

| | Radiographic speed | Sharpness | Graininess |
|---|---|---|---|
| Example 1 | 115 | 98 | $1.1 \times 10^{-2}$ |
| Com. Example 1 | 100 | 100 | $1.2 \times 10^{-2}$ |

As is evident from the results set forth in Table 2, the radiographic intensifying screen of the invention having the light-reflecting layer containing hollow polymer particles (Example 1) was enhanced in the radiographic speed almost without lowering the sharpness of the image, as compared with the conventional radiographic intensifying screen having the light-reflecting layer containing titanium oxide (Comparison Example 1). Further, the intensifying screen of the invention provided an image of more improved graininess than the conventional screen.

EXAMPLE 2

Hollow particles of styrene-acrylic polymer (trade name: VONCOAT PP-2000S, available from Dainippon Ink & Chemicals Inc., Japan) and an acrylic acid ester copolymer (trad name: Arontac A-2422H, available from Toagosei Chemical Industry Co., Ltd., Japan) are sufficiently mixed, to prepare a homogeneous coating dispersion and having the ratio between the binder and the particles of 1:5 (binder:particles, by weight).

The coating dispersion was applied evenly onto a polyethylene terephthalate sheet (support, thickness: 250 μm) placed horizontally on a glass plate by using a doctor blade. Subsequently, the support having a layer of the coating dispersion was placed in an oven and heated to dryness at a temperature gradually rising from 25° to 100° C. Thus, a light-reflecting layer having a thickness of 50 μm was formed on the support.

To a mixture solvent of ethanol and methyl ethyl ketone having a mixing ratio of 7:3 (ethanol:methyl ethyl ketone) were successively added 90 parts by weight of vinyl acetate (available from Kishida Chemicals Co., Ltd., Japan), 10 parts by weight of nitrocellulose and a particulate divalent europium activated barium fluorobromide ($BaFBr:Eu^{2+}$) stimulable phosphor. The mixture was sufficiently stirred by means of a propeller agitator to obtain a homogeneous coating dispersion having a mixing ratio of 1:20 (binder:phosphor, by weight) and a viscosity of 25–30 PS (at 25° C.).

The coating dispersion was applied onto the light-reflecting layer and dried in the same manner as described above, to form a phosphor layer having a thickness of 350 μm.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a light-reflecting layer, a phosphor layer and a transparent protective film was prepared.

COMPARISON EXAMPLE 2

The procedure of Example 2 was repeated except for using titanium dioxide instead of the hollow particles of styrene-acrylic polymer, to form a light-reflecting layer on the support.

Using the support provided with the light-reflecting layer, a radiation image storage panel consisting essentially of a support, a light-reflecting layer, a phosphor layer and a transparent protective film was prepared in the same manner as described in Example 2.

Each of the light-reflecting layers prepared in Example 2 and Comparison Example 2 was measured on the spectral reflectance in the same manner as described above. The same results as shown in FIG. 1 were obtained. The results are also set forth in Table 3.

TABLE 3

| Light-reflecting layer | Reflectance (%) 350 nm | Reflectance (%) 550 nm |
|---|---|---|
| Hollow polymer particles | 95 | 95 |
| Titanium dioxide | 9 | 88 |

As is evident from obtaining the same results as shown in FIG. 1 and the results set forth in Table 2, the reflection spectrum of the light-reflecting layer containing hollow polymer particles employed in the radiation image storage panel of the present invention (Example 2) extended to a shorter wavelength side than that of the light-reflecting layer containing titanium dioxide (Comparison Example 2), and the light-reflecting layer according to the invention had excellent reflecting property particularly in the near ultraviolet to visible region of 300–450 nm.

The radiation image storage panels were evaluated on the sensitivity, the sharpness and the graininess of an image provided thereby according to the following tests.

(1) Sensitivity

The radiation image storage panel was exposed to X-rays at a voltage of 80 KVp and subsequently excited with a He-Ne laser beam (wavelength: 632.8 nm), to measure the sensitivity.

(2) Sharpness of image

The radiation image storage panel was exposed to X-rays at a voltage of 80 KVp through a CTF chart and subsequently scanned with a He-Ne laser beam to excite the stimulable phosphor particles contained in the panel. The light emitted by the phosphor particles was detected and converted to electric signals by means of a photosensor (a photomultiplier having spectral sensitivity of type S-5). From the electric signals, the radiation image of CTF chart was reproduced by an image reproducing device to obtain a visible image on a display device. The contrast transfer function (CTF) value of the visible image was determined. The sharpness of the image was evaluated with the value (%) at a spatial frequency of 2 cycle/mm.

(3) Graininess of image

The radiation image storage panel was exposed to X-rays at a voltage of 80 KVp and at a radiation dose of 100 mR and subsequently scanned with a He-Ne laser beam to excite the stimulable phosphor particles contained in the panel. The light emitted by the phosphor particles of the panel was detected and converted to electric signals by means of the photosensor. Based on the electric signals, a visible image was recorded on an ordinary photographic film by means of a film scanner. The RMS value of the visible image was measured at a photographic density (D) of 1.2 and at a spatial frequency of 0.4–5 cycle/mm. The graininess of the image was evaluated on the basis of the RMS values.

The results are set forth in Table 4. The sensitivity and the sharpness of the image were respectively expressed by a relative value based on the value of Comparison Example 2 being 100.

TABLE 4

| | Sensitivity | Sharpness | Graininess |
|---|---|---|---|
| Example 2 | 135 | 98 | $2.51 \times 10^{-2}$ |
| Com. Example 2 | 100 | 100 | $2.69 \times 10^{-2}$ |

As is evident from the results set forth in Table 4, the radiation image storage panel of the invention having the light-reflecting layer containing hollow polymer particles (Example 2) was remarkably enhanced in the sensitivity, as compared with the conventional radiation image storage panel having the light-reflecting layer containing titanium oxide (Comparison Example 2). Further, the panel of the invention provided an image having almost the same sharpness as that of the conventional panel and having much more improved graininess than the conventional one.

We claim:

1. A radiation image converting material comprising a support, a light-reflecting layer which comprises a binder and a light-reflecting material dispersed therein, and a phosphor layer which comprises a binder and a phosphor dispersed therein, superposed in this order, which is characterized in that said light-reflecting layer contains polymer particles of hollow structure as the light-reflecting material.

2. The radiation image converting material as claimed in claim 1, in which said polymer particles of hollow structure have outer diameters ranging from 0.2 to 1 μm and inner diameters ranging from 0.05 and 0.7 μm.

3. The radiation image converting material as claimed in claim 1, in which said polymer particles of hollow structure are made of a styrene polymer and/or an acrylic polymer.

4. The radiation image converting material as claimed in claim 1, in which the ratio between said binder and said polymer particles of hollow structure in the light-reflecting layer is in the range of 1:1–1:50, by weight.

5. The radiation image converting material as claimed in claim 1, in which said phosphor is a phosphor which gives spontaneous emission, and the radiation image converting material is a radiographic intensifying screen.

6. The radiation image converting material as claimed in claim 5, in which said phosphor gives spontaneous emission in the near ultraviolet to visible region.

7. The radiation image converting material as claimed in claim 6, in which said phosphor is a divalent europium activated alkaline earth metal fluorohalide phosphor.

8. The radiation image converting material as claimed in claim 1, in which said phosphor is a stimulable phosphor which gives stimulated emission, and the radiation image converting material is a radiation image storage panel.

9. The radiation image converting material as claimed in claim 8, in which said stimulable phosphor gives stimulated emission in the wavelength region of 300–500 nm when excited with stimulating rays in the wavelength region of 400–900 nm.

10. The radiation image converting material as claimed in claim 9, in which said stimuable phosphor is a divalent europium activated alkaline earth metal halide phosphor.

11. The radiation image converting material as claimed in claim 9, in which said stimulable phosphor is a rare earth element activated rare earth oxyhalide phosphor.

* * * * *